United States Patent
Wang (10) Patent No.: US 12,009,982 B2
(45) Date of Patent: Jun. 11, 2024

(54) NETWORK SLICE ALLOCATION METHOD, TERMINAL AND STORAGE MEDIUM

(71) Applicant: ZTE CORPORATION, Guangdong (CN)

(72) Inventor: Cheng Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/011,659

(22) PCT Filed: May 24, 2021

(86) PCT No.: PCT/CN2021/095572
§ 371 (c)(1),
(2) Date: Dec. 20, 2022

(87) PCT Pub. No.: WO2022/001484
PCT Pub. Date: Jan. 6, 2022

(65) Prior Publication Data
US 2023/0336424 A1 Oct. 19, 2023

(30) Foreign Application Priority Data
Jun. 28, 2020 (CN) .......................... 202010599503.0

(51) Int. Cl.
*H04L 41/0823* (2022.01)
*H04L 41/0895* (2022.01)

(52) U.S. Cl.
CPC ...... *H04L 41/0895* (2022.05); *H04L 41/0836* (2013.01)

(58) Field of Classification Search
CPC ............. H04L 41/0895; H04L 41/0893; H04L 41/0836
(Continued)

(56) References Cited

U.S. PATENT DOCUMENTS

2010/0046631 A1* 2/2010 Raveendran ....... H04N 21/4436
375/E7.027
2018/0183940 A1* 6/2018 Kosseifi .............. H04M 15/885
(Continued)

FOREIGN PATENT DOCUMENTS

| CN | 108810993 A | 11/2018 |
|----|-------------|---------|
| CN | 108833181 A | 11/2018 |

(Continued)

OTHER PUBLICATIONS

WIPO, International Search Report dated Aug. 5, 2021.
(Continued)

*Primary Examiner* — Ruolei Zong
(74) *Attorney, Agent, or Firm* — Li & Cai Intellectual Property (USA) Office (57) ABSTRACT

Embodiments of the present application relate to a network slice allocation method, a terminal and a storage medium, and belong to the field of communications. The method includes if it is monitored that an application program is in a running state, determining an application type to which the application program belongs; and selecting at least one network slice from network slices corresponding to the application type, and allocating the at least one network slice to the application program; and the network slices corresponding to the application type refer to the network slices which are matched with the application type in advance.

15 Claims, 4 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2018/0293701 A1 | 10/2018 | Appu | |
| 2018/0332441 A1* | 11/2018 | Shaw | H04L 63/105 |
| 2018/0359337 A1* | 12/2018 | Kodaypak | H04L 41/0897 |
| 2019/0281494 A1 | 9/2019 | Chan | |
| 2020/0022193 A1 | 1/2020 | Ma et al. | |
| 2020/0059856 A1* | 2/2020 | Cui | H04W 24/02 |
| 2020/0169921 A1 | 5/2020 | Zhu et al. | |
| 2020/0275357 A1* | 8/2020 | Bordeleau | H04L 41/0806 |
| 2020/0275358 A1* | 8/2020 | Bordeleau | H04L 41/5054 |
| 2020/0275359 A1* | 8/2020 | Bordeleau | H04L 41/0806 |
| 2021/0105193 A1* | 4/2021 | Chong | H04L 41/0896 |
| 2021/0385683 A1* | 12/2021 | Boyapalle | H04W 48/18 |

FOREIGN PATENT DOCUMENTS

| | | | |
|---|---|---|---|
| CN | 109391648 A | 2/2019 | |
| CN | 110383896 A | 10/2019 | |
| ES | 2727159 T3 * | 10/2019 | H04L 43/00 |

OTHER PUBLICATIONS

Ericsson, "Correction to Service Description," 3GPP TSG-CT WG3 Meeting #109e, C3-202228 eNA, 29.520 Rel-16, Apr. 16-24, 2020.
European Patent Office, the Extended European Search Report dated Oct. 13, 2023, for corresponding EP application No. 21833353.2.

* cited by examiner

NETWORK SLICE ALLOCATION METHOD, TERMINAL AND STORAGE MEDIUM

CROSS-REFERENCE TO RELATED APPLICATIONS

The present disclosure is based on and claims the priority to Chinese Patent Application No. 202010599503.0 filed on Jun. 28, 2020, the contents of which are incorporated herein by reference in their entirety.

TECHNICAL FIELD

Embodiments of the present disclosure relate to the field of communications, and in particular, to a network slice allocation method, a terminal and a storage medium.

BACKGROUND

Network slicing is an on-demand networking method, which can allow an operator to separate out a plurality of virtual end-to-end networks on a unified infrastructure, and each network slice is logically isolated across a radio access network, a bearer network and a core network, so as to adapt to various types of applications. Each network slice at least includes a radio subslice, a bearer subslice and a core network subslice.

For allocating different slices to different application programs, the UE Route Selection Policy (URSP) needs to be preconfigured in a terminal or the terminal needs to acquire the URSP from a network side device. Since the URSP includes the Network Slice Selection Policy (NSSP) including rule elements such as Data Network Name (DNN) and/or Application Identity card (Application ID), when an application program in the terminal initiates data connection through the DNN and/or the Application ID, slice matching can be carried out according to the rule elements in the NSSP, thus realizing allocation of required network slices to the different application programs. However, even if the URSP is configured in the terminal, most existing application programs do not initiate data connection through the DNN and/or the Application ID, which cannot allow for the allocation of the required network slices to the different application programs.

SUMMARY

The embodiments of the present disclosure provide a network slice allocation method, including: in response to monitoring that an application program is in a running state, determining an application type to which the application program belongs; and selecting at least one network slice from network slices corresponding to the application type, and allocating the at least one network slice to the application program; wherein the network slices corresponding to the application type refer to the network slices which are matched with the application type in advance.

The embodiments of the present disclosure further provide a terminal, including: at least one processor; and a memory which is connected to and communicates with the at least one processor; wherein the memory has an instruction executable by the at least one processor stored therein which, when executed by the at least one processor, enables the at least one processor to perform the network slice allocation method described above.

The embodiments of the present disclosure further provide a computer-readable storage medium storing a computer program which, when executed by a processor, causes the processor to perform the network slice allocation method described above.

DETAIL DESCRIPTION OF EMBODIMENTS

In order to make the objectives, technical solutions and advantages of the embodiments of the present disclosure clearer, each of the embodiments of the present disclosure is further described in detail below with reference to the drawings. However, it should be understood by those of ordinary skill in the art that many technical details are set forth in each of the embodiments of the present disclosure for enabling those of ordinary skill in the art to better understand the present disclosure. However, the technical solutions sought to be protected by the present disclosure can be implemented even without those technical details and various changes and modifications based on the following embodiments. The division of the following embodiments is for convenience of description, and should not constitute any limitation to specific implementations of the present disclosure, and the embodiments may be combined with one another or refer to one another if no conflict is incurred.

The embodiments of the present disclosure aim to provide a network slice allocation method, a terminal and a storage medium, which can realize allocation of network slices according to requirements of application programs.

The first embodiment of the present disclosure relates to a network slice allocation method applied to a terminal such as a mobile phone.

Figure 1:
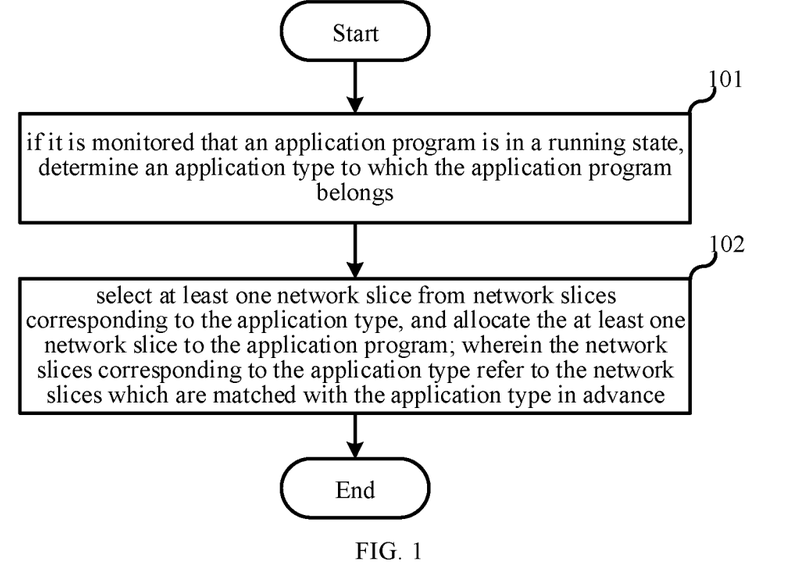
FIG. 1 is a flowchart illustrating a network slice allocation method according to a first embodiment of the present disclosure.

An exemplary process of the network slice allocation method according to the present embodiment is shown in FIG. 1, and includes: operation 101, if it is monitored that an application program is in a running state, determining an application type to which the application program belongs; and operation 102, selecting at least one network slice from network slices corresponding to the application type, and allocating the at least one network slice to the application program. The network slices corresponding to the application type refer to the network slices which are matched with the application type in advance.

Exemplarily, the terminal classifies application programs according to main service types of the application programs to obtain application types, and the application types include, but are not limited to, a video type, a communication type and a payment type. Since the application programs in different application types have different requirements for network performance of the network slices, the terminal may match the network slices with each application type in advance according to the requirements of the application programs in the application types, and store a corresponding relationship between the application types and the network slices. Thus, the network slices matched with the application types in advance may be known by looking up the corresponding relationship, the corresponding relationship between the application types and the network slices may be stored in the form of table, and the storage form of the corresponding relationship is not specifically limited in the present embodiment.

The terminal may monitor each application program in real time or according to a preset period, and the preset period may be set according to actual needs and is not specifically limited in the present embodiment. If the terminal monitors that an application program is in the running state, the application type of the application program in the running state is determined, then the network slices corresponding to the application program are determined by looking up the corresponding relationship between the application type and the network slices, and at least one network slice is selected from the network slices and allocated to the application program. For example, if the terminal monitors that an application program A and an application program B are in the running state, the application program A belongs to the application type of video service, the application program B belongs to the application type of communication service, network slices corresponding to the video service are a network slice 1, a network slice 2 and a network slice 3, and network slices corresponding to the communication service are a network slice 4 and a network slice 5, then at least one network slice is selected from the network slices 1, 2 and 3 and allocated to the application program A, and at least one network slice is selected from the network slices 4 and 5 and allocated to the application program B.

Figure 2:
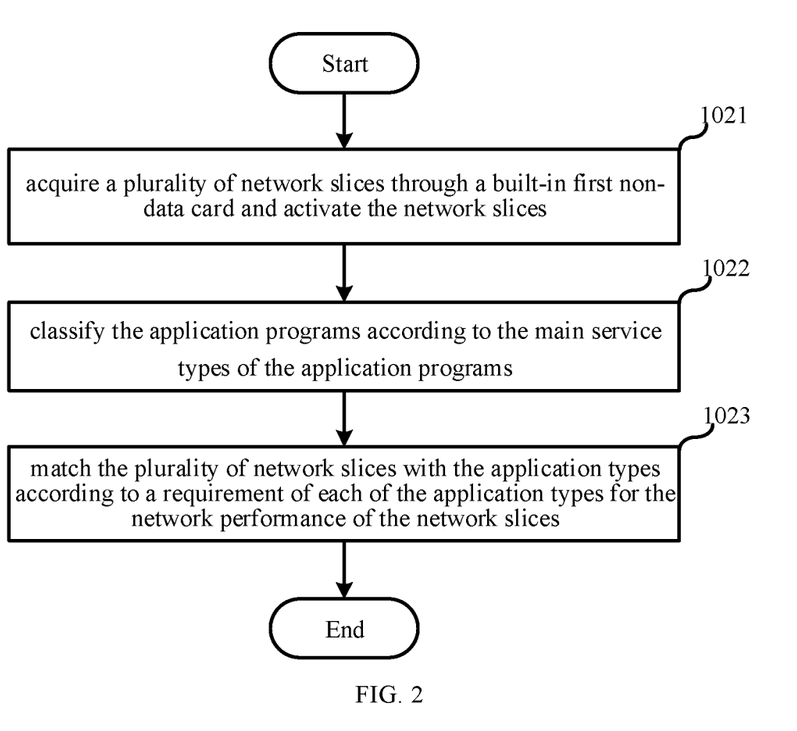
FIG. 2 is a flowchart of a process of matching network slices with application types in advance according to the first embodiment of the present disclosure.

In an example, an exemplary flowchart of a process of matching the network slices with the application types in advance is shown in FIG. 2, and the process includes the following operations 1021 to 1023.

In operation 1021, a plurality of network slices are acquired through a built-in first non-data card and are activated.

Exemplarily, a manufacturer of the terminal subscribes to a network slice service of a network operator in advance. When the terminal is to use the network slice service provided by a network, the terminal needs to register in the network through a non-data card. An exemplary registration process is as follows: the terminal sends a Registration Request message, which carries Request Network Slice Selection Assistance Information (Request-NSSAI), to a network side through the non-data card, the network side searches subscription information of the manufacturer of the terminal after receiving the Registration Request message, verifies which Network Slice Selection Assistance Information (NSSAI) in the Request-NSSAI is allowed according to Subscribed Single Network Slice Selection Assistance Information (Subscribed S-NSSAI) included in the subscription information, and informs the terminal of the allowed NSSAI through Allowed Network Slice Selection Assistance Information (Allowed NSSAI) carried in a Registration Accept message, and the terminal determines the network slices which are allowed, by the network, to be used by the non-data card of the terminal according to the Allowed NSSAI. The NSSAI is a set of Single Network Slice Selection Assistance Information (S-NSSAI), and each piece of S-NSSAI identifies one network slice. In the present embodiment, the registration process is carried out in the network through the first non-data card built in the terminal, so that the network slices which are allowed, by the network, to be used by the first non-data card of the terminal may be determined according to the Allowed NSSAI, thus acquiring the plurality of network slices through the first non-data card. The network slices carry the DNN parameter and establish data connection in advance according to the DNN parameter, so as to be in an activated state. When an application program needs to use a network slice, the application program may establish data connection without initiating the data connection.

In operation 1022, the application programs are classified according to the main service types of the application programs.

In operation 1023, the plurality of network slices are matched with the application types according to a requirement of each of the application types for the network performance of the network slices.

In an example, the terminal classifies the application programs according to the main service types of the application programs to obtain the application types, which include, but are not limited to, the video type, the communication type and the payment type. For example, the application program A can execute both a service a and a service b, the service a is a video service, the service b is a communication service and the service a is a main service of the application program A, so the application type of the application program A is the video type. Since the application programs in the different application types have the different requirements for the network performance of the network slices, the terminal may match the plurality of network slices with each application type according to the requirements of the application programs in the application types, and store a corresponding relationship between the application types and the plurality of network slices. For example, if the application programs in the video type have a high bandwidth requirement, the application programs in the video type are matched with the network slices 1, 2 and 3, which have high-rate service quality; if the application programs in the communication type have a low bandwidth requirement, the application programs in the communication type are matched with the network slice 4 and 5, which have low-rate service quality; and a corresponding relationship between the video type and the network slices 1, 2 and 3 and a corresponding relationship between the communication type and the network slice 4 and 5 are stored. In another example, the terminal may classify the application programs according to application types preset by a user and a requirement of each of the application types on the application programs, match a plurality of network slices with each application type in advance according to the requirements of the application programs in the application types for the network performance of the network slices, and store the corresponding relationship between the application types and the network slices.

By activating the network slices in advance by the terminal, the network slices matched with each application type are in the activated state, so that the application program may establish data connection without initiating the data connection when the application program needs to use the network slices.

In an example, selecting the at least one network slice from the network slices corresponding to the application type and allocating the at least one network slice to the application program includes: if the application program is in a foreground running state, selecting L network slices with higher network performance from K network slices corresponding to the application type, and allocating the L network slices to the application program; or, if the application program is in a background running state and it is monitored that no other application programs belonging to the same application type as the application program are in the running state, selecting L network slices with higher network performance from K network slices corresponding to the application type, and allocating the L network slices to the application program; where both L and K are integers greater than 0 and L is less than or equal to K. Selecting the L network slices with higher network performance from the K network slices corresponding to the application type refers to arranging the K network slices corresponding to the application type in descending order of network performance, and selecting the first L network slices from the K network slices.

Exemplarily, the network performance refers to service quality of the network slices, such as high-rate service quality, medium-rate service quality, and low-latency and high-reliability service quality. The network slices with the high-rate service quality and the network slices with the low-latency and high-reliability service quality may be considered as the network slices with higher network performance. For example, in a case where the number of the network slices corresponding to the application type is 3, and the three network slices are a network slice with the high-rate service quality, a network slice with the medium-rate service quality, and a network slice with the low-latency and high-reliability service quality, respectively, if the application program A is in the foreground running state, two network slices with higher network performance may be selected from the three network slices, that is, the network slice with the high-rate service quality and the network slice with the low-latency and high-reliability service quality are allocated to the application program A; and if the application program A is in the background running state and it is monitored that no other application programs belonging to the same application type as the application program A are in the running state, two network slices with higher network performance may be selected from the three network slices, that is, the network slice with the high-rate service quality and the network slice with the low-latency and high-reliability service quality are allocated to the application program A. When the application program is in the foreground running state, or the application program is in the background running state and it is monitored that no other application programs belonging to the same application type as the application program are in the running state, any network slice may be selected from the network slices corresponding to the application type for the application program, and selecting and allocating the network slice with higher network performance to the application program may enable the application program to run better.

If the application program is switched from the foreground running state to the background running state and it is monitored that no other application programs belonging to the same application type as the application program are in the running state, the L network slices with higher network performance are selected from the K network slices corresponding to the application type and are allocated to the application program; and if the application program is switched from the background running state to the foreground running state, the L network slices with higher network performance are selected from the K network slices corresponding to the application type and are allocated to the application.

In an example, if the application program is in the foreground running state, L network slices are randomly selected from the K network slices corresponding to the application type and are allocated to the application program, with L being less than or equal to K. If the application program is in the background running state and it is monitored that no other application programs belonging to the same application type as the application program are in the running state, L network slices are randomly selected from the K network slices corresponding to the application type and are allocated to the application program, with L being less than or equal to K.

In an example, if the application program is in the foreground running state and it is monitored that another application program belonging to the same application type as the application program is in the background running state, the L network slices with higher network performance are selected from the K network slices corresponding to the application type and are allocated to the application program, with L being less than K. Exemplarily, some network slices with higher network performance are selected from the network slices corresponding to the application type for the application program in the foreground running state, and another application program in the background running state may use the remaining network slices. With such method, the network slices may be allocated more reasonably, so that another application program that belongs to the same application type as the application program and is in the background running state may also have access to the network slices.

In an example, if the application program is in the foreground running state and it is monitored that another application program belonging to the same application type as the application program is in the background running state, L network slices are selected from the K network slices corresponding to the application type and are allocated to the application program, with L being less than K. Exemplarily, some network slices are selected from the network slices corresponding to the application type for the application program in the foreground running state, and another application program in the background running state may use the remaining network slices. With such method, the network slices may be allocated more reasonably, so that another application program that belongs to the same application type as the application program and is in the background running state may also have access to the network slices.

In an example, after selecting the L network slices with higher network performance from the K network slices corresponding to the application type and allocating the L network slices to the application program in the case where the application program is in the foreground running state and it is monitored that another application program belonging to the same application type as the application program is in the background running state, the method further includes: selecting at least one network slice from the remaining (K-L) network slices, and allocating the at least one network slice to the another application program. With such method, at least one network slice is selected from the remaining network slices and allocated to the another application program in the background running state, so that the another application program in the background running state may have also access to the network slices.

In an example, selecting the at least one network slice from the remaining (K-L) network slices, and allocating the at least one network slice to the another application program includes: if more than one another application program exists, selecting at least one network slice from the remaining (K-L) network slices and allocating the at least one network slice to the other application programs according to priority levels of the other application programs and the network performance of the remaining (K-L) network slices; and the higher the priority level of one of the other application programs is, the higher the network performance of the allocated network slice is.

Exemplarily, the terminal pre-stores corresponding relationships between the application programs in each application type and the priority levels, and the priority levels of the application programs may be known by looking up the corresponding relationships, and the higher the priority level of the application program is, the higher the requirement for the network performance of the network slices is. Thus, the terminal may select at least one network slice from the remaining (K-L) network slices and allocate the at least one network slice to the other application programs according to the priority levels of the other application programs in the background running state, and the higher the priority level of one of the other application programs is, the higher the network performance of the allocated network slice is. When the number of the network slices for the other application programs in the background running state is greater than (K-L), one same network slice may be allocated to the application programs with lower priority levels. For example, in a case where the number of the other application programs in the background running state is 3, the three application programs are an application program B, an application program C and an application program D respectively, and the priority levels of the application programs B, C and D satisfy B>C>D, if the number of the remaining network slices is 3, a network slice 1 and a network slice 2 are network slices with the medium-rate service quality and a network slice 3 is a network slice with the low-rate service quality, then the network slices 1 and 2 are allocated to the application programs B and C, and the network slice 3 is allocated to the application program D; and if the number of the remaining network slices is 2, and the network slices 1 and 2 are a network slice with the medium-rate service quality and a network slice with the low-rate service quality, then the network slice 1 is allocated to the application program B, and the network slice 2 is allocated to the application programs C and D. Since the application programs with different priority levels have different requirements for the network performance of the network slices, allocation of the remaining network slices may be carried out more reasonably by allocating the remaining network slices according to the priority levels of the application programs.

In an example, if the application program is in the background running state and it is monitored that no other application programs belonging to the same application type as the application program are in the running state, any L network slices are selected from the K network slices corresponding to the application type and allocated to the application program, with L being less than or equal to K.

In an example, if the application program is in the background running state and it is monitored that another application belonging to the same application type as the application program is in the background running state, at least one network slice is selected from the K network slices corresponding to the application type and allocated to each application program in the background running state.

In an example, if the application program is in the background running state and it is monitored that another application belonging to the same application type as the application program is in the background running state, at least one network slice is selected from the K network slices corresponding to the application type and allocated to each application program in the background running state according to the priority levels of the application programs in the background running state and the network performance of the network slices corresponding to the application type.

In the present embodiment, if it is monitored that an application program is in the running state, the application type to which the application program belongs is determined; and at least one network slice is selected from the network slices corresponding to the application type and allocated to the application program, with the network slices corresponding to the application type referring to the network slices which are allocated to the application type in advance. Since the application programs in the different application types have the different requirements for the network performance of the network slices, the network slices allocated to the application types in advance are the network slices meeting the requirements of the application programs. When it is monitored that the application program is in the running state, the application type of the application program is first determined, and then at least one network slice is selected from the network slices corresponding to the application type and allocated to the application program. Thus, the network slice allocated to the application program is the network slice meeting the requirement of the application program, that is, the allocation of the network slices according to the requirements of the application programs is realized.

A second embodiment of the present disclosure relates to a network slice allocation method. The second embodiment is substantially the same as the first embodiment, and mainly differs from the first embodiment in that: after selecting and allocating the at least one network slice to the application program, the method further includes: if it is monitored that the requirement of the application program for the network performance of the network slices changes, determining a reason for the change in the requirement for the network performance, and adjusting the network slice allocated to the application program according to the reason.

Figure 3:
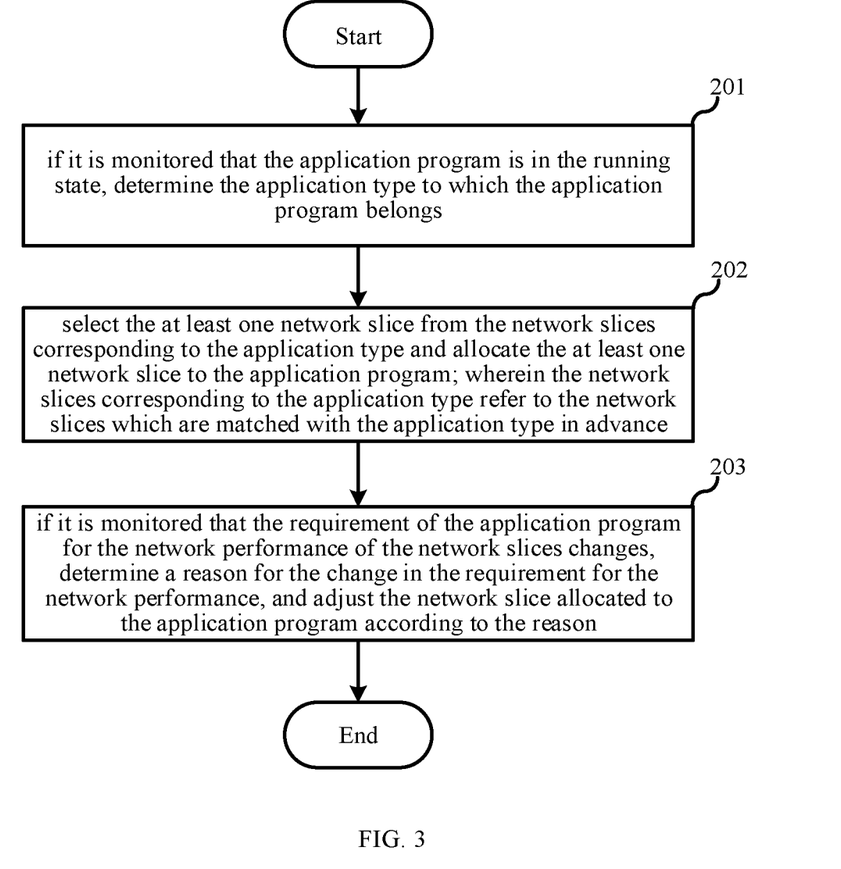
FIG. 3 is a flowchart illustrating a network slice allocation method according to a second embodiment of the present disclosure.

An exemplary flowchart of the network slice allocation method according to the present embodiment is shown in FIG. 3, and the network slice allocation method includes the following operations 201 to 203.

In operation 201, if it is monitored that the application program is in the running state, the application type to which the application program belongs is determined.

In operation 202, the at least one network slice is selected from the network slices corresponding to the application type and allocated to the application program. The network slices corresponding to the application type refer to the network slices which are matched with the application type in advance.

The operations 201 and 202 are similar to the operations 101 and 102 described in the first embodiment, and thus will not be described in detail here.

In operation 203, if it is monitored that the requirement of the application program for the network performance of the network slices changes, a reason for the change in the requirement for the network performance is determined, and the network slice allocated to the application program is adjusted according to the reason.

Exemplarily, the application program may change during a running process, for example, a running state changes, a service to execute changes, and the number of executed services changes, and those changes may cause the change in the requirement of the application program for the network performance of the network slices. If it is monitored that the requirement of the application program for the network performance of the network slices changes, the reason for the change in the requirement for the network performance is first determined, and then the network slice allocated to the application program is adjusted according to the reason. With such method, the network slice allocated to the application program may be adjusted according to the reason for the change in the requirement of the application program for the network performance of the network slices, which allows for more reasonable allocation.

In an example, adjusting the network slice allocated to the application program according to the reason includes: if the reason is that an application type to which a current service of the application program belongs changes, selecting at least one network slice from network slices corresponding to the changed application type, and allocating the at least one network slice to the application program; if the reason is that the number of socket requests and/or the number of download threads of the application program decrease(s), reducing the network slice allocated to the application program; and if the reason is that the application program is frozen, releasing the network slice allocated to the application program.

Exemplarily, the application program may be capable of executing a plurality of services, and the terminal may determine the current service of the application program by monitoring a data protocol used by the application program, for example, the terminal determines that the current service of the application program is a video service if the data protocol used by the application program is the User Datagram Protocol (UDP), the Real-time Transport Protocol (RTP), or the Real-time Transport Control Protocol (RTSP), the terminal determines that the current service of the application program is a payment service if the data protocol used by the application program is the Secure Sockets Layer (SSL) Protocol, and the terminal determines that the current service of the application program is a communication service if the data protocol used by the application program is the Hypertext Transport Protocol (HTTP). If the application type to which the current service of the application program belongs changes, it is indicated that the requirement of the application program for the network slices changes, so that at least one network slice is selected from the network slices corresponding to the changed application type and allocated to the application program, and a process of selecting and allocating the at least one network slice to the application program is similar to the operation 102 described in the first embodiment, and thus will not be described in detail here. If the number of socket requests and/or the number of download threads of the application program decrease(s), it is indicated that the requirement of the application program for the network slices is lowered, so that the network slice allocated to the application program is reduced. For example, if the number of socket requests and/or the number of download threads are(is) always 1, and the number of the network slices already allocated to the application program A is 2, that is, the network slice 1 with the high-rate service quality and the network slice 2 with the medium-rate service quality have already been allocated to the application program A, then the network slices allocated to the application program A are reduced, with only one of the two network slices, i.e., the network slice 1 with higher network performance, left for the application program A. If the application program is frozen, it is indicated that the application program does not need to perform data transmission, then the network slices already allocated to the application program are released.

In the present embodiment, the terminal may adjust the network slice allocated to the application program according to the reason for the change in the requirement of the application program, which allows for more reasonable allocation.

A third embodiment of the present disclosure relates to a network slice allocation method, and the third embodiment is substantially the same as the first embodiment, and mainly differs from the first embodiment in that: after selecting and allocating the at least one network slice to the application program, the method further includes: if it is monitored that a battery level is lower than a preset value, adjusting the network slice allocated to the application program.

Figure 4:
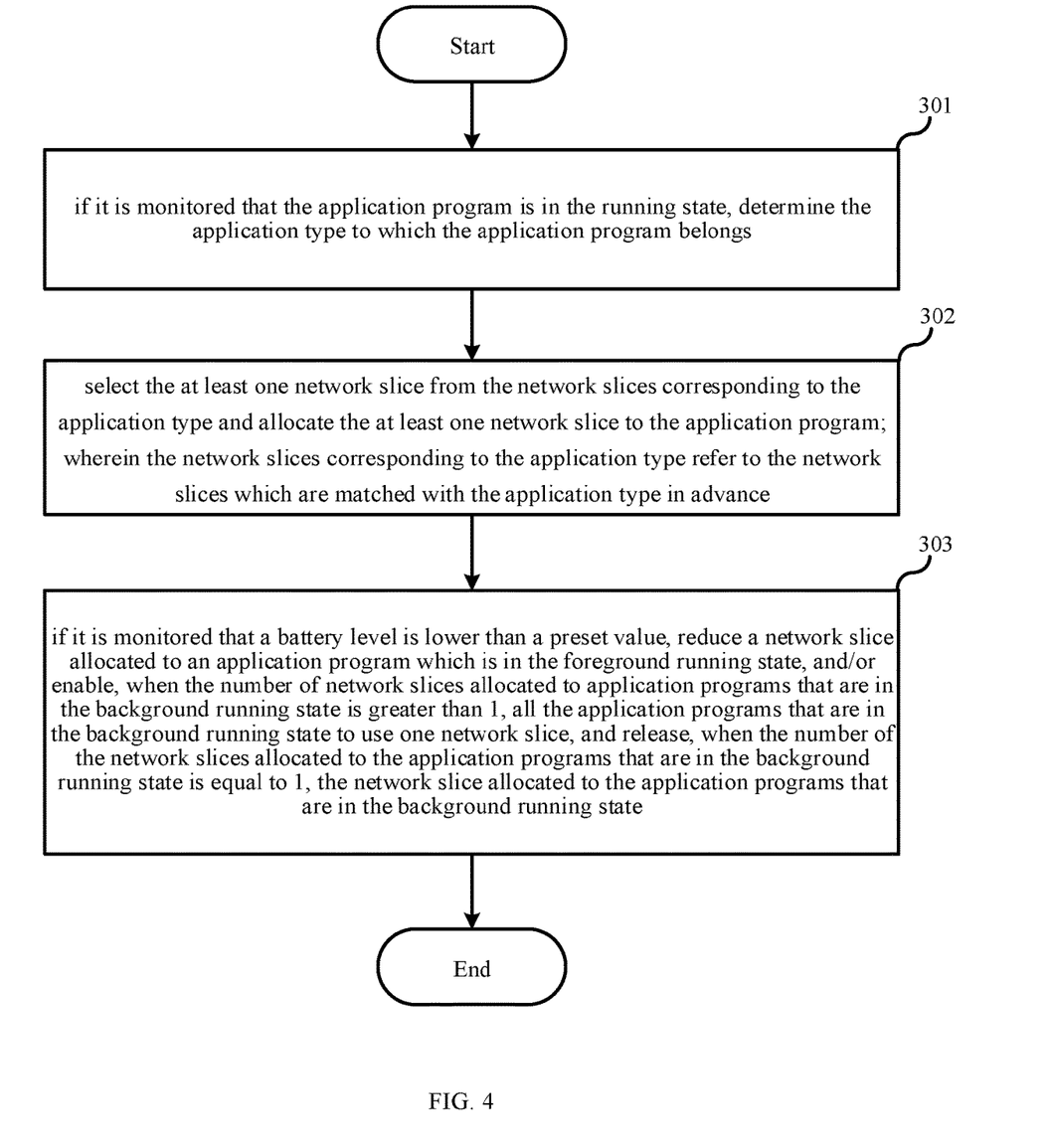
FIG. 4 is a flowchart illustrating a network slice allocation method according to a third embodiment of the present disclosure.

An exemplary flowchart of the network slice allocation method according to the present embodiment is shown in FIG. 4, and the network slice allocation method includes the following operations 301 to 303.

In operation 301, if it is monitored that the application program is in the running state, the application type to which the application program belongs is determined.

In operation 302, the at least one network slice is selected from the network slices corresponding to the application type and allocated to the application program. The network slices corresponding to the application type refer to the network slices which are matched with the application type in advance.

The operations 301 and 302 are similar to the operations 101 and 102 described in the first embodiment, and thus will not be described in detail here.

In operation 303, if it is monitored that a battery level is lower than a preset value, a network slice allocated to an application program which is in the foreground running state is reduced, and/or when the number of network slices allocated to application programs that are in the background running state is greater than 1, all the application programs that are in the background running state are enabled to use one network slice, and when the number of the network slices allocated to the application programs that are in the background running state is equal to 1, the network slice allocated to the application programs that are in the background running state is released.

Exemplarily, the preset value may be set according to actual needs, and is not specifically limited in the preset embodiment. When it is detected that the battery level is lower than the preset value, which indicates that the battery level is too low, the terminal may reduce the network slice allocated to the application program in the foreground running state, but needs to leave at least one network slice to the application program in the foreground running state, and/or the terminal may enable, when the number of the network slices allocated to the application programs that are in the background running state is greater than 1, all the application programs that are in the background running state to use one network slice.

When it is detected that the battery level is lower than the preset value, the terminal may reduce the network slice allocated to the application program in the foreground running state, but needs to leave at least one network slice to the application program in the foreground running state, and/or the terminal may release, when the number of the network slices allocated to the application programs that are in the background running state is equal to 1, the network slice allocated to the application programs that are in the background running state.

In an example, if it is monitored that the battery level is lower than the preset value, the network slice allocated to the application program in the foreground running state is reduced, and/or the network slices allocated to the application programs that are in the background running state are released when the number of the network slices allocated to the application programs that are in the background running state is greater than 1.

In an example, after selecting and allocating the at least one network slice to the application program, the method further includes: if it is monitored that the requirement of the application program for the network performance of the network slices changes, determining a reason for the change in the requirement for the network performance, and adjusting the network slice allocated to the application program according to the reason.

In the present embodiment, the terminal may adjust the allocation of the network slices according to the battery level, thereby saving power consumption of a battery.

A fourth embodiment of the present disclosure relates to a network slice allocation method, and the fourth embodiment is substantially the same as the first embodiment, and mainly differs from the first embodiment in that: the network slices matched with each application type are the network slices acquired through the built-in first non-data card, and after selecting and allocating the at least one network slice to the application program, the method further includes: if it is monitored that a quality index value of the network slices which are allowed, by the network, to be used by the first non-data card is smaller than a preset index value, determining network slices which are allowed, by the network, to be used by a second non-data card; and if the network slices which are allowed, by the network, to be used by the second non-data card meet a requirement of each application type for the network slices, resetting the network slices corresponding to each application type.

Figure 5:
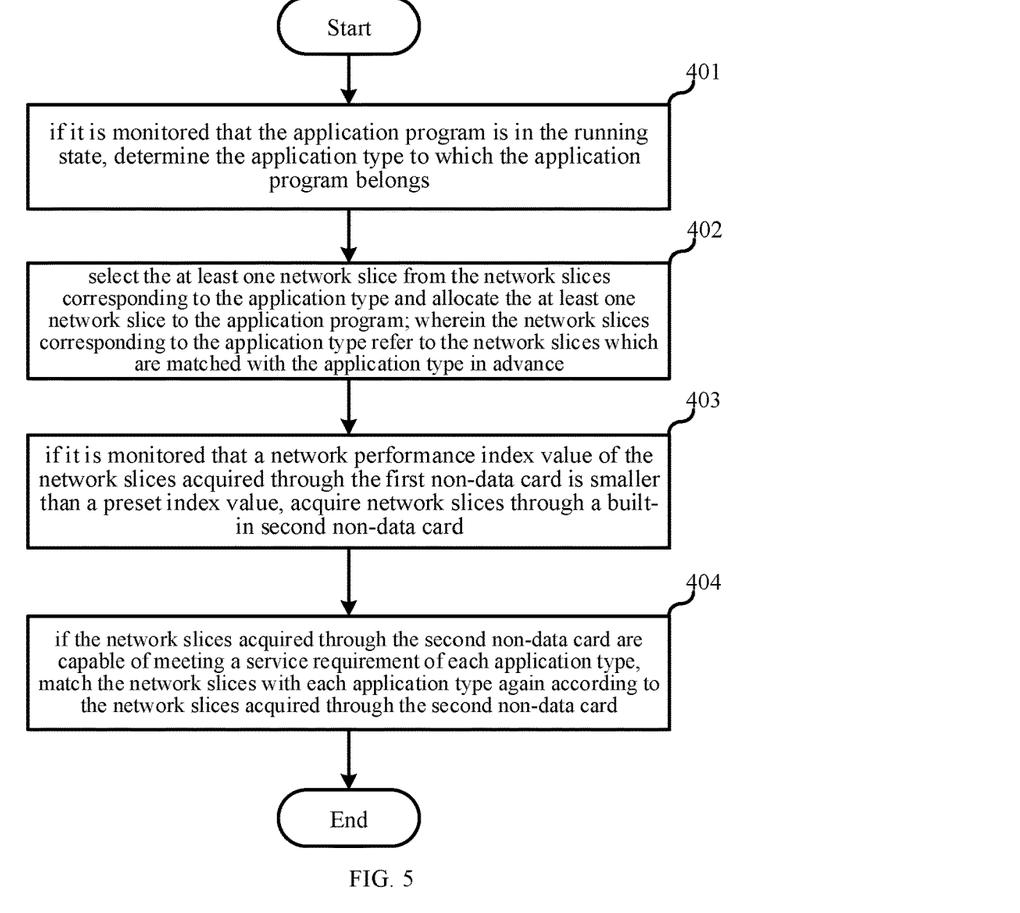
FIG. 5 is a flowchart illustrating a network slice allocation method according to a fourth embodiment of the present disclosure.

An exemplary flowchart of the network slice allocation method according to the present embodiment is shown in FIG. 5, and the network slice allocation method includes the following operations 401 to 404.

In operation 401, if it is monitored that the application program is in the running state, the application type to which the application program belongs is determined.

In operation 402, the at least one network slice is selected from the network slices corresponding to the application type and allocated to the application program. The network slices corresponding to the application type refer to the network slices which are matched with the application type in advance.

The operations 401 and 402 are similar to the operations 101 and 102 described in the first embodiment, and thus will not be described in detail here.

In operation 403, if it is monitored that a network performance index value of the network slices acquired through the first non-data card is smaller than a preset index value, network slices are acquired through a built-in second non-data card.

Exemplarily, the preset index value may be set according to actual needs, and is not specifically limited in the preset embodiment. At least two non-data cards are built in the terminal, and the network slices matched with each application type are the network slices acquired through the built-in first non-data card. If the terminal monitors that the network performance index value of the network slices acquired through the first non-data card is smaller than the preset index value, it is indicated that the network slices are not capable of meeting the requirement of the application program for the network performance of the network slices at this time, then the terminal registers in the network again through the second non-data card, so as to determine the network slices which are allowed, by the network, to be used by the second non-data card, thus acquiring the network slices through the second non-data card. A method for determining the network slices which are allowed, by the network, to be used by the second non-data card is similar to the operation 1021 described in the first embodiment, and thus will not be described in detail here.

In operation 404, if the network slices acquired through the second non-data card are capable of meeting a service requirement of each application type, the network slices are matched with each application type again according to the network slice acquired through the second non-data card.

Exemplarily, after the network slices are acquired through the second non-data card, if the network slices acquired through the second non-data card are capable of meeting the service requirement of each application type, the network slices are matched with each application type again according to the network slices acquired through the second non-data card, that is, the network slices acquired through the second non-data card are matched with each application type in advance. A method for matching the network slices acquired through the second non-data card with each application type in advance is similar to the operations 1022 and 1023 described in the first embodiment, and thus will not be described in detail here.

In an example, after selecting and allocating the at least one network slice to the application program, the method further includes: if it is monitored that the requirement of the application program for the network performance of the network slices changes, determining a reason for the change in the requirement for the network performance, and adjusting the network slice allocated to the application program according to the reason.

In an example, after selecting and allocating the at least one network slice to the application program, the method further includes: if it is monitored that a battery level is lower than a preset value, reducing a network slice allocated to an application program which is in the foreground running state, and/or enabling, when the number of network slices allocated to application programs that are in the background running state is greater than 1, all the application programs that are in the background running state to use one network slice, and releasing, when the number of the network slices allocated to the application programs that are in the background running state is equal to 1, the network slice allocated to the application programs that are in the background running state.

In an example, after selecting and allocating the at least one network slice to the application program, the method further includes: if it is monitored that the requirement of the application program for the network performance of the network slices changes, determining the reason for the change in the requirement for the network performance, and adjusting the network slice allocated to the application program according to the reason; and if it is monitored that the battery level is lower than the preset value, reducing the network slice allocated to the application program which is in the foreground running state, and/or enabling, when the number of the network slices allocated to the application programs that are in the background running state is greater than 1, all the application programs that are in the background running state to use one network slice, and releasing, when the number of the network slices allocated to the application programs that are in the background running state is equal to 1, the network slice allocated to the application programs that are in the background running state.

In the present embodiment, the terminal may meet the requirement of the application program for the network slices through switching of the non-data cards.

Figure 6:
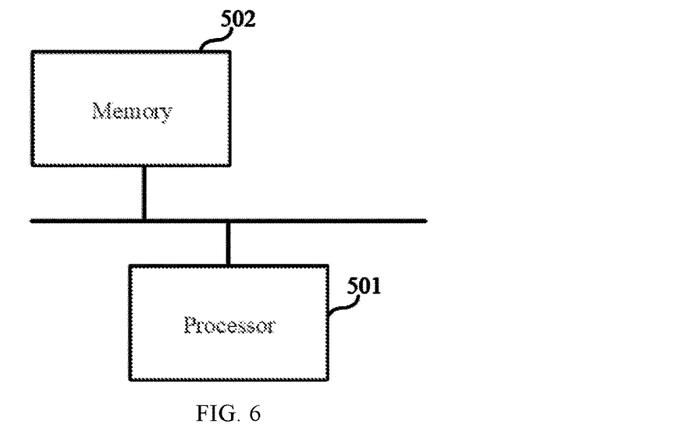
FIG. 6 is a schematic structural diagram of a terminal according to a fifth embodiment of the present disclosure.

A fifth embodiment of the present disclosure relates to a terminal, as shown in FIG. 6, including: at least one processor 501; and a memory 502 which is connected to and communicates with the at least one processor 501. The memory 502 has an instruction executable by the at least one processor 501 stored therein, and the instruction is executed by the at least one processor 501 to enable the at least one processor 501 to perform the network slice allocation method described above.

The memory and the processor are connected through buses, which may include any number of interconnected buses and bridges. The buses connect various circuits of one or more processors and the memory together, and may also connect various other circuits together, such as a peripheral device, a voltage stabilizer and a power management circuit, which are well known in the prior art and thus will not be further described herein. Bus interfaces provide interfaces between the buses and a transceiver. The transceiver may be one element or a plurality of elements, such as a plurality of receivers and a plurality of transmitters, and provides units configured to communicate with various other devices over a transmission medium. Data processed by the processor is transmitted over a wireless medium through an antenna. Further, the antenna receives data and transmits the data to the processor.

The processor is configured to manage the buses and perform general processing, and may also provide various functions, including a timing function, a peripheral interface function, a voltage regulation function, a power management function and other control functions. The memory may be used to store data used by the processor when performing operations.

A sixth embodiment of the present disclosure relates to a computer-readable storage medium storing a computer program, which when executed by a processor, causes the processor to implement the method described in the above embodiments.

That is, as can be understood by those of ordinary skill in the art, implementation of all or part of the operations of the method described in the above embodiments may be achieved by a program instructing related hardware, and the program is stored in a storage medium and includes several instructions to enable a device (which may be a single chip, a chip, etc.) or a processor to perform all or part of the operations of the method described in all the embodiments of the present disclosure. The above storage medium includes: a Universal Serial Bus Flash Disk (a USB flash disk), a mobile hard disk, a Read-Only Memory (ROM), a Random Access Memory (RAM), a magnetic disk, an optical disc, or various media capable of storing program codes.

It should be understood by those of ordinary skill in the art that all the above embodiments are exemplary implementations of the present disclosure, and various changes can be made to the above embodiments in the forms and the details in practical applications without departing from the spirit and scope of the present disclosure.

What is claimed is:

1. A network slice allocation method, comprising:
in response to monitoring that an application program is in a running state, determining an application type to which the application program belongs; and
selecting at least one network slice from network slices corresponding to the application type, and allocating the at least one network slice to the application program; wherein the network slices corresponding to the application type refer to the network slices which are matched with the application type in advance,
wherein selecting the at least one network slice from the network slices corresponding to the application type and allocating the at least one network slice to the application program comprises:
in response to the application program being in the foreground running state and monitoring that another application program belonging to the same application type as the application program is in the background running state, selecting the L network slices with higher network performance from the K network slices corresponding to the application type, and allocating the L network slices to the application program, where both L and K are integers greater than 0, and L is less than K; or
in response to the application program being in a background running state and monitoring that no other application programs belonging to the same application type as the application program are in the running state, selecting L network slices with higher network performance from K network slices corresponding to the application type, and allocating the L network slices to the application program, where both L and K are integers greater than 0, and L is less than or equal to K.

2. The network slice allocation method of claim 1, wherein after selecting the L network slices with higher network performance from the K network slices corresponding to the application type and allocating the L network slices to the application program in response to the application program being in the foreground running state and monitoring that the another application program belonging to the same application type as the application program is in the background running state, the method further comprises:
selecting at least one network slice from remaining (K−L) network slices, and allocating the at least one network slice to the other application program.

3. The network slice allocation method of claim 2, wherein selecting the at least one network slice from the remaining (K−L) network slices and allocating the at least one network slice to the other application program comprises:
in response to more than one another application program existing, selecting the at least one network slice from the remaining (K−L) network slices and allocating the at least one network slice to other application programs according to priority levels of the other application programs and network performance of the remaining (K−L) network slices; wherein the higher the priority level of one of the other application programs is, the higher the network performance of an allocated network slice is.

4. A network slice allocation method, comprising:
in response to monitoring that an application program is in a running state, determining an application type to which the application program belongs;
selecting at least one network slice from network slices corresponding to the application type, and allocating the at least one network slice to the application program; wherein the network slices corresponding to the application type refer to the network slices which are matched with the application type in advance; and in response to monitoring that a requirement of the application program for network performance of the network slices changes, determining a reason for a change in the requirement for the network performance, and adjusting the network slice allocated to the application program according to the reason, wherein adjusting the network slice allocated to the application program according to the reason comprises one of the following operations:

in response to the reason being that an application type to which a current service of the application program belongs changes, selecting at least one network slice from network slices corresponding to the changed application type, and allocating the at least one network slice to the application program;

in response to the reason being that at least one of a number of socket requests or a number of download threads of the application program decreases, reducing the network slice allocated to the application program; or in response to the reason being that the application program is frozen, releasing the network slice allocated to the application program.

5. The network slice allocation method of claim 1, after selecting and allocating the at least one network slice to the application program, further comprising:

in response to monitoring that a battery level is lower than a preset value, performing at least one of the following operations:

reducing a network slice allocated to an application program which is in a foreground running state, or enabling, in a case where a number of network slices allocated to application programs that are in a background running state is greater than 1, all the application programs that are in the background running state to use one network slice, and releasing, in a case where the number of the network slices allocated to the application programs that are in the background running state is equal to 1, a network slice allocated to the application programs that are in the background running state.

6. The network slice allocation method of claim 1, wherein network slices matched with each application type are the network slices acquired through a built-in first non-data card; and after selecting and allocating the at least one network slice to the application program, the method further comprises:

in response to monitoring that a network performance index value of the network slices acquired through the first non-data card is smaller than a preset index value, acquiring network slices through a built-in second non-data card; and in response to the network slices acquired through the second non-data card being capable of meeting a service requirement of each application type, matching the network slices with each application type again according to the network slices acquired through the second non-data card.

7. The network slice allocation method of claim 1, wherein the network slices are matched with the application type in advance in a following way:

acquiring a plurality of network slices through a built-in first non-data card, and activating the plurality of network slices;

classifying application programs according to main service types of the application programs; and matching the plurality of network slices with application types according to a requirement of each of the application types for network performance of the network slices.

8. A terminal, comprising:
at least one processor; and
a memory which is connected to and communicates with the at least one processor;

wherein the memory has an instruction executable by the at least one processor stored therein which, when executed by the at least one processor, enables the at least one processor to:

in response to monitoring that an application program is in a running state, determine an application type to which the application program belongs; and select at least one network slice from network slices corresponding to the application type, and allocate the at least one network slice to the application program;

wherein the network slices corresponding to the application type refer to the network slices which are matched with the application type in advance, wherein selecting the at least one network slice from the network slices corresponding to the application type and allocating the at least one network slice to the application program comprises:

in response to the application program being in the foreground running state and monitoring that another application program belonging to the same application type as the application program is in the background running state, selecting the L network slices with higher network performance from the K network slices corresponding to the application type, and allocating the L network slices to the application program, where both L and K are integers greater than 0, and L is less than K; or in response to the application program being in a background running state and monitoring that no other application programs belonging to the same application type as the application program are in the running state, selecting L network slices with higher network performance from K network slices corresponding to the application type, and allocating the L network slices to the application program, where both L and K are integers greater than 0, and L is less than or equal to K.

9. A non-transitory computer-readable storage medium storing a computer program which, when executed by a processor, causes the processor to perform the network slice allocation method of claim 1.

10. The terminal of claim 8, wherein the memory has an instruction executable by the at least one processor stored therein which, when executed by the at least one processor, further enables the at least one processor to:

after selecting the L network slices with higher network performance from the K network slices corresponding to the application type and allocating the L network slices to the application program in response to the application program being in the foreground running state and monitoring that the another application program belonging to the same application type as the application program is in the background running state, select at least one network slice from remaining (K−L) network slices, and allocating the at least one network slice to the another application program.

11. The terminal of claim 10, wherein selecting the at least one network slice from the remaining (K−L) network slices and allocating the at least one network slice to the other application program comprises:

in response to more than one another application program existing, selecting the at least one network slice from the remaining (K−L) network slices and allocating the at least one network slice to other application programs according to priority levels of the other application programs and network performance of the remaining (K−L) network slices; wherein the higher the priority level of one of the other application programs is, the higher the network performance of an allocated network slice is.

12. A terminal, comprising:
at least one processor; and
a memory which is connected to and communicates with the at least one processor;
wherein the memory has an instruction executable by the at least one processor stored therein which, when executed by the at least one processor, enables the at least one processor to:
in response to monitoring that an application program is in a running state, determine an application type to which the application program belongs;
select at least one network slice from network slices corresponding to the application type, and allocate the at least one network slice to the application program;
wherein the network slices corresponding to the application type refer to the network slices which are matched with the application type in advance; and
in response to monitoring that a requirement of the application program for network performance of the network slices changes, determine a reason for a change in the requirement for the network performance, and adjust the network slice allocated to the application program according to the reason,
wherein adjusting the network slice allocated to the application program according to the reason comprises one of the following operations:
in response to the reason being that an application type to which a current service of the application program belongs changes, selecting at least one network slice from network slices corresponding to the changed application type, and allocating the at least one network slice to the application program;
in response to the reason being that at least one of a number of socket requests or a number of download threads of the application program decreases, reducing the network slice allocated to the application program; or in response to the reason being that the application program is frozen, releasing the network slice allocated to the application program.

13. The terminal of claim 8, wherein the memory has an instruction executable by the at least one processor stored therein which, when executed by the at least one processor, further enables the at least one processor to:
after selecting and allocating the at least one network slice to the application program,
in response to monitoring that a battery level is lower than a preset value, perform at least one of the following operations:
reducing a network slice allocated to an application program which is in a foreground running state, or
enabling, in a case where a number of network slices allocated to application programs that are in a background running state is greater than 1, all the application programs that are in the background running state to use one network slice, and releasing, in a case where the number of the network slices allocated to the application programs that are in the background running state is equal to 1, a network slice allocated to the application programs that are in the background running state.

14. The terminal of claim 8, wherein network slices matched with each application type are the network slices acquired through a built-in first non-data card; and the memory has an instruction executable by the at least one processor stored therein which, when executed by the at least one processor, further enables the at least one processor to:
after selecting and allocating the at least one network slice to the application program,
in response to monitoring that a network performance index value of the network slices acquired through the first non-data card is smaller than a preset index value, acquire network slices through a built-in second non-data card; and
in response to the network slices acquired through the second non-data card being capable of meeting a service requirement of each application type, match the network slices with each application type again according to the network slices acquired through the second non-data card.

15. A non-transitory computer-readable storage medium storing a computer program which, when executed by a processor, causes the processor to perform the network slice allocation method of claim 4.

* * * * *